H. S. McKEE.
Molds for Decorating Glass-Ware.
No. 206,596.  Patented July 30, 1878.
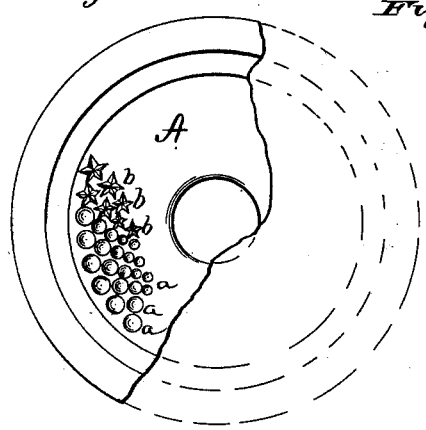
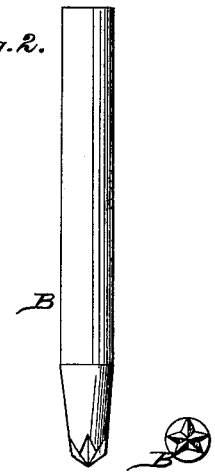
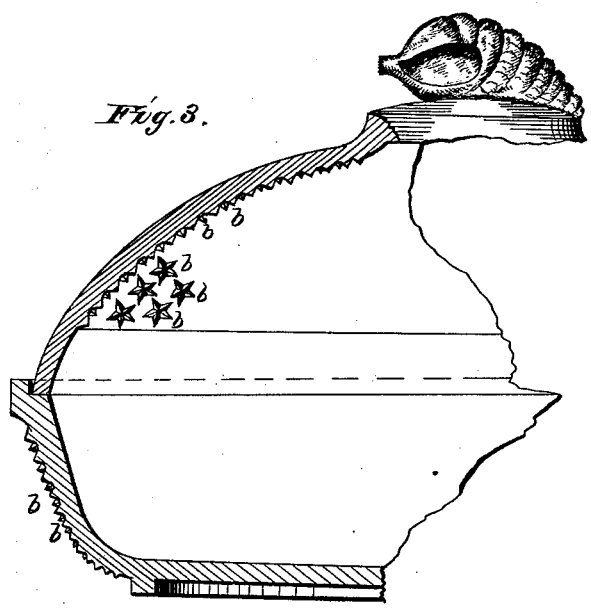
WITNESSES
INVENTOR
H. Sellers McKee
ATTORNEY

UNITED STATES PATENT OFFICE.

H. SELLERS McKEE, OF PITTSBURG, PENNSYLVANIA.

IMPROVEMENT IN MOLDS FOR DECORATING GLASSWARE.

Specification forming part of Letters Patent No. 206,596, dated July 30, 1878; application filed June 26, 1878.

*To all whom it may concern:*

Be it known that I, H. SELLERS McKEE, of Pittsburg, in the county of Allegheny, and in the State of Pennsylvania, have invented certain new and useful Improvements in Decorating Table-Glassware; and do hereby declare that the following is a full, clear, and exact description thereof, reference being had to the accompanying drawings, and to the letters of reference marked thereon, making a part of this specification.

The nature of my invention relates to decorating table-glassware; and it consists in preparing the metal molds for the same by first puncturing or drilling the mold and then stamping with a hardened set or punch, as will be hereinafter more fully set forth.

In order to enable others skilled in the art to which my invention appertains to make and use the same, I will now proceed to describe its construction and operation, referring to the annexed drawing, in which—

Figure 1 is a plan view of a portion of the mold. Fig. 2 shows a side and end view of the punch. Fig. 3 is a detailed section of an article of glassware.

In the drawing I have shown the decoration as consisting in the massing of small stars, and these may be either alone or in combination with other designs.

The decoration is made by the use of metal molds, plunger, and press. The molds A are of metal, similar to those in common use in glass factories, and the decoration is made by first making circular indentations or recesses $a$ $a$, to the required depth in the sides of the molds or plunger by the use of a drill or boring-tool.

The angular decoration, which is shown as a series of fine stars, $b$, is then put in the recesses $a$ made by the drill by the use of a hard metal punch, B, upon the point of which is a star.

Any other angular figure or figures can be made by the use of the drill and punch, as described.

By first drilling the mold before applying the punch the solid part of the mold is relieved, as the boring of the recesses makes spaces, so that the points of the punch can have the desired effect.

Having thus fully described my invention, what I claim as new, and desire to secure by Letters Patent, is—

In metallic molds for table-glassware, the method of forming angular decorations by first drilling or boring circular indentations or recesses in the mold or plunger, and then using a figured punch, substantially as herein set forth.

In testimony that I claim the foregoing I have hereunto set my hand.

H. SELLERS McKEE.

Witnesses:
   JOS. K. BROWN,
   A. M. BACON.